United States Patent [19]

Bartholomew

[11] Patent Number: 4,526,411
[45] Date of Patent: Jul. 2, 1985

[54] SWIVELABLE QUICK CONNECTOR ASSEMBLY

[75] Inventor: Donald D. Bartholomew, Marine City, Mich.

[73] Assignee: Proprietary Technology, Inc., Southfield, Mich.

[21] Appl. No.: 560,746

[22] Filed: Dec. 12, 1983

Related U.S. Application Data

[63] Continuation-in-part of Ser. No. 201,711, Oct. 29, 1980, Pat. No. 4,423,892.

[51] Int. Cl.³ .............................................. F16L 37/12
[52] U.S. Cl. ............................. 285/305; 285/DIG. 22
[58] Field of Search ............ 285/305, 354 (U.S. only), 285/DIG. 25, 285, DIG. 22

[56] References Cited

U.S. PATENT DOCUMENTS

| 921,691 | 5/1909 | Friday ................... 285/DIG. 22 X |
| 1,542,421 | 6/1925 | Strongson . |
| 2,123,889 | 7/1939 | Gleason . |
| 2,441,344 | 5/1948 | Bosworth ...................... 285/321 |
| 2,585,887 | 2/1952 | Woodward ................... 285/319 X |
| 3,092,404 | 6/1963 | MacWilliam .................. 285/354 X |
| 3,314,696 | 4/1967 | Ferguson et al. . |
| 3,450,424 | 6/1969 | Calisher . |
| 3,453,005 | 7/1969 | Foults ...................... 285/DIG. 25 X |
| 3,534,988 | 10/1970 | Lindsey . |
| 3,538,940 | 11/1970 | Graham . |
| 3,574,359 | 4/1971 | Klein . |
| 3,584,902 | 6/1971 | Vyse . |
| 3,711,125 | 1/1973 | Dehar ........................... 285/319 X |
| 3,718,350 | 2/1973 | Klein . |
| 3,724,882 | 4/1973 | Dehar . |
| 3,826,523 | 7/1974 | Eschbaugh ................... 285/319 X |
| 3,929,356 | 12/1975 | De Vincent et al. . |
| 3,929,357 | 12/1975 | De Vincent et al. ... 285/DIG. 25 X |
| 3,980,324 | 9/1976 | Bouteille et al. . |
| 4,005,883 | 2/1977 | Guest ........................... 285/322 |
| 4,009,896 | 3/1977 | Brewer ......................... 285/305 |
| 4,080,752 | 3/1978 | Burge . |
| 4,111,464 | 9/1978 | Asano et al. . |
| 4,123,089 | 10/1978 | Viero et al. . |
| 4,123,091 | 10/1978 | Cosentino et al. . |
| 4,128,264 | 12/1978 | Oldford . |
| 4,135,745 | 1/1979 | Dehar .................... 285/DIG. 22 X |
| 4,214,586 | 7/1980 | Mericle ................. 285/DIG. 22 X |
| 4,266,814 | 5/1981 | Gallagher ...................... 285/319 |

FOREIGN PATENT DOCUMENTS

| 2307154 | 8/1974 | Fed. Rep. of Germany ...... 285/319 |
| 2611233 | 9/1977 | Fed. Rep. of Germany ...... 285/319 |
| 2622269 | 11/1977 | Fed. Rep. of Germany ...... 285/308 |
| 1030535 | 5/1966 | United Kingdom ................ 285/305 |
| 1145667 | 3/1969 | United Kingdom ................ 285/305 |

Primary Examiner—Thomas F. Callaghan
Attorney, Agent, or Firm—Harness, Dickey & Pierce

[57] ABSTRACT

A quick connector assembly for use with tubular conduits is disclosed as comprising a housing having an axial bore for receiving one end of the conduit, an elastomeric ring-like seal is disposed in the bore for providing a fluid tight seal between confronting portions of the conduit and the housing, an annular bushing is disposed in the bore for positioning the seal and for guiding the one end of the conduit into nesting relationship with the bore, and a retainer is detachably secured to the housing and is cooperable with an annular projection on the conduit for securing the conduit in its operative position within the bore, the retainer is formed from a cap having several lateral slots which cooperate with a groove formed by the housing such that an external clip having two legs may be used to secure the cap to the housing.

1 Claim, 3 Drawing Figures

SWIVELABLE QUICK CONNECTOR ASSEMBLY

CROSS REFERENCE TO A RELATED APPLICATION

"This application is a continuation-in-part of application Ser. No. 201,711 filed Oct. 29, 1980, now U.S. Pat. No. 4,423,892, which is hereby incorporated by reference."

BACKGROUND AND SUMMARY OF THE INVENTION

The present invention relates to a connector assembly for providing a swivelable quick connection.

In the automotive industry, as well as for many other industries, the need always exists for low-cost, reliable, and easy to assemble components. This need is especially apparent with respect to providing a connection between fluid carrying conduits, such as a fuel or refrigerant lines. In older threaded connectors, substantial assembly time could be accumulated in screwing on a cap to a fitting and tightening the cap down to the proper torque needed to provide for a fluid tight seal. Further, an inventory would have to be maintained to keep track of the number of caps and fittings, and any liners or other components that may be necessary. Also, retightening of the caps may be required to maintain the seal after the automobile or other system has been put in use.

Accordingly, it is the primary object of the present invention to provide an improved connector assembly for providing a swivelable quick connection between fluid conveying conduits.

In addition, it is an object of the present invention to provide a pre-asembled connector housing and retainer element so that a connection to a tubular fluid conveying conduit may be made in one step without resorting to any tools.

Another object of the present invention is to provide a connector assembly that may be employed to join dissimilar electrically conducting materials that would be otherwise subject to galvanic corrosion.

It is a further object of the present invention to provide a connector assembly which is adapted to provide for a bleed-down position when disconnecting a conduit from the housing of the connector assembly.

Additional objects and advantages of the present invention will become apparent from a reading of the detailed description of the preferred embodiments which makes reference to the following set of drawings in which:

DETAILED DESCRIPTION OF THE PREFERRED EMBODIMENTS

Figure 1:
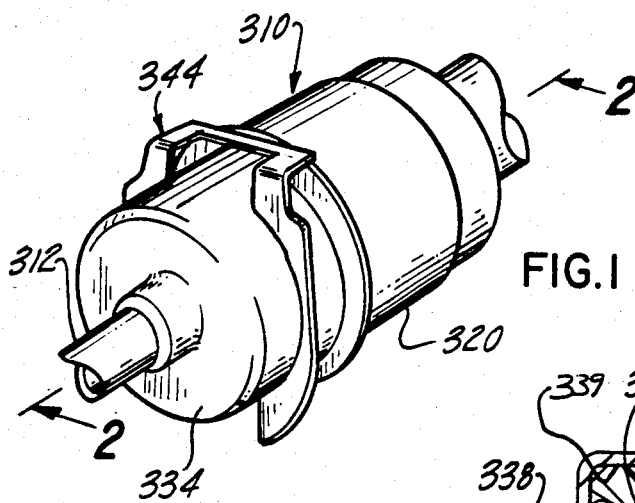
FIG. 1 is a perspective view of an embodiment of a connector assembly according to this invention.
Figure 2:
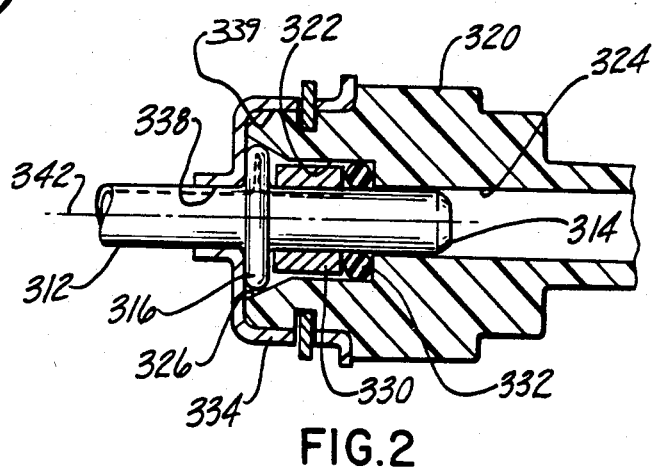
FIG. 2 is a longitudinal cross-sectional view of a connector assembly taken along line 2—2 of FIG. 1.
Figure 3:
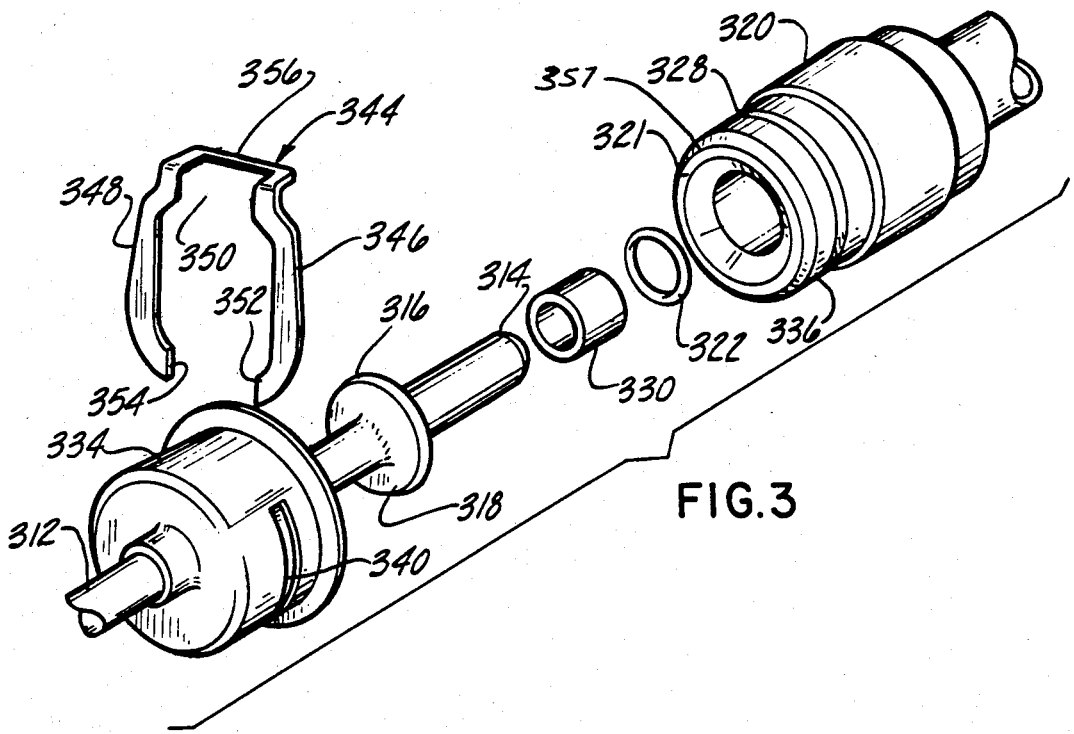
FIG. 3 is an exploded perspective view of the connector assembly illustrated in FIGS. 1 and 2.

An embodiment of a connector assembly according to this invention is illustrated with reference to FIGS. 1, 2 and 3, and is generally designated by reference character 310. Conduit 312 forms a beveled connection end 314 and an enlarged annular surface 316 spaced a predetermined distance from the conduit end. Annular surface 316 is preferably formed by local bulging of the conduit. The side of annular surface 316 opposite end 314 forms a blocking wall portion 318. The conduit is adapted to be received within housing or boss 320 which includes first diameter portion 322 and second diameter portion 324. In addition, the housing bores include flared portion 326 providing an enlarged diameter at the housing end 321. The exterior of housing 320 is cylindrical in shape and includes an annular groove 328, which groove is spaced from housing end 321 and lies on external diameter section 336. Bushing member 330 is disposed within housing first diameter portion 322 and acts to radially locate conduit 312 within housing 320 and further acts to support elastomeric sealing ring 332.

Cap member 334 forms a first internal diameter 339 sufficient to be closely received by the external diameter portion 336 of housing 320. Cap 334 further forms second diameter section 338 which closely receives conduit 312. Cap 334 further includes a pair of apertures 340 disposed on opposite sides of the cap which are directed along a plane transverse to the central axis 342 of conduit 312. The longitudinal position of apertures 340 is such that when the cap is installed onto housing external diameter portion 336, annular groove 328 is in registry with apertures 340. Retainer clip 344 is provided having a pair of leg members 346 and 348 interconnected by cross member 350. Provided at each of the free ends of legs 346 and 348 are inwardly directed barbs 352 and 354 respectively. The separation distance between barbs 352 and 354 is slightly less than the internal diameter of annular groove 328. Retainer clip cross member 350 further forms flange 356 which permits convenient manipulation of the retainer clip.

Assembly of the connector assembly according to the embodiment of a connector assembly according to FIGS. 1, 2 and 3 proceeds as follows. Cap 334 is first positioned onto conduit 312 as shown by FIG. 2. Next, bushing 330 and seal 332 are disposed within housing first diameter portion 322 and such position may be maintained by providing an interference fit between the bushing and the housing first diameter section. Conduit member 312 is then inserted such that beveled conduit end 312 becomes disposed within housing second diameter portion 322. Such insertion is aided by flared portion 326 which acts as a guide surface. When used in this manner, a flange section similar to that of bushing 140 in FIG. 9 of U.S. Pat. No. 4,423,892, but adapted to lead 326 is used to prevent bushing 330 from being pushed inward by conduit end 314. As the conduit is inserted, bushing 330 acts to radially locate the conduit and protects seal 332 from damage due to improper insertion of the conduit within the housing. In this position, the cap may be located onto housing 320 such that apertures 340 are in registry with annular groove 328. Retainer clip is inserted such that it is positioned whereby legs 346 and 348 lie within a place transverse to the central axis 342 of the conduit 312. As retainer clip 344 is inserted, legs 346 and 348 are caused to slightly spread since the spacing between barbs 352 and 354 is less than the inner diameter of annular groove 328. Once retainer clip 344 is in its final position, the barbs are permitted to approach one another since they are not located at the full extent of the internal diameter of annular groove 328. This configuration permits retainer clip 344 to become latched onto the connector assembly thereby preventing inadvertent detachment of components.

Flange 356 is provided to permit convenient manipulation of the retainer clip, permitting it to be easily installed and removed. Once cap 334 is installed, bushing 330 supports elastomeric sealing element 332 between it and the annular shoulder formed at the intersection between first diameter portion 322 and second diameter 324, thereby preventing the seal from being displaced by a differential fluidic pressure.

The preferred assembly method is to assemble all connector parts on the conduit end. A lead chamfer 357 is placed at the entrance of housing external diameter portion 336 so that legs 346 and 348 of retainer clip 344 which with bushing 330, seal 322 and cap 334 are all pre-assembled onto conduit 312. As the conduit and connector assembly are urged onto the housing or boss 320, legs 346 and 348 are spread by chamfer 357. When all elements are in the proper spatial relationship, clip legs 346 and 348 will snap into groove 328 completing and locking the assembly.

While the above description constitutes the preferred embodiment of the present invention, it will be appreciated that the invention is susceptible to modification, variation and change without departing from the proper scope and fair meaning of the accompanying claims.

What is claimed is:

1. A connector assembly for providing a quick connection, comprising:
    a tubular conduit adapted to convey fluid, having outwardly projecting annular surface means, formed at a predetermined distance from an end of said conduit to be connected, for providing a blocking wall portion disposed transversely to a central axis of said conduit, said end of said conduit to be connected being radially inwardly beveled;
    a cylindrical housing having variable diameter axial bore means formed therein for receiving said conduit at a first end and for providing a fluid path therethrough, said bore means providing a first diameter portion at said first end and a second diameter portion at second end, the magnitude of said first diameter being greater than the magnitude of said second diameter, said first diameter portion of said housing being flared radially outwardly at said first end, the exterior of said housing being formed with an annular groove which is spaced a predetermined distance from said first end, and said first end of said housing being formed with a radially inward chamfer;
    elastomeric ring means disposed in said first diameter portion of said bore means for providing a seal between said conduit and said housing;
    annular bushing means disposed in said first diameter portion of said bore means for positioning said ring means and for radially locating said conduit within said bore means of said housing;
    cap means, demountably coupled to said first end of said housing, for cooperating with said blocking wall portion of said annular surface means to resist the disconnection of said conduit from said housing, said cap means including a first diameter section closely overfitting said housing and a second diameter section closely receiving said conduit along the portion of said conduit facing said blocking wall portion, and a pair of slots oriented along a plane transverse with respect to the longitudinal axis of said conduit;
    a retainer clip formed from sheet metal for removably attaching said cap means to said housing, said retainer clip comprising a pair of generally parallel elongated legs joined at one end by a cross member portion formed to provide a predetermined separation between said legs, said legs being disposed in said annular groove of said housing through said slots of said cap means, said retainer means including an inwardly directed barb disposed on each said legs generally at the end thereof.

* * * * *